United States Patent
Meier et al.

(10) Patent No.: US 9,481,220 B2
(45) Date of Patent: Nov. 1, 2016

(54) METHOD FOR PRODUCING A TRANSVERSE MEMBER

(71) Applicant: Ford Global Technologies, LLC, Dearborn, MI (US)

(72) Inventors: Christoph Meier, Cologne (DE); Theo Kueppers, Waldfeucht NRW (DE)

(73) Assignee: Ford Global Technologies, LLC, Dearborn, MI (US)

( * ) Notice: Subject to any disclaimer, the term of this patent is extended or adjusted under 35 U.S.C. 154(b) by 278 days.

(21) Appl. No.: 14/143,998

(22) Filed: Dec. 30, 2013

(65) Prior Publication Data

US 2014/0196270 A1    Jul. 17, 2014

(30) Foreign Application Priority Data

Jan. 14, 2013  (DE) .................. 10 2013 200 406

(51) Int. Cl.
*B60G 7/00*    (2006.01)

(52) U.S. Cl.
CPC .............. *B60G 7/001* (2013.01); *B60G 7/005* (2013.01); *B60G 2204/416* (2013.01); *B60G 2206/122* (2013.01); *Y10T 29/49826* (2015.01)

(58) Field of Classification Search
CPC   B60G 7/002; B60G 7/005; B60G 2206/122; Y10T 29/49826
See application file for complete search history.

(56) References Cited

U.S. PATENT DOCUMENTS

| 4,571,795 A | * | 2/1986 | Shiets | B22D 19/10 29/26 B |
| 2011/0272911 A1 | * | 11/2011 | Gerhards | B60G 7/001 280/124.134 |
| 2012/0098228 A1 | | 4/2012 | Wilson et al. | |

FOREIGN PATENT DOCUMENTS

| DE | 102010007946 A1 | 8/2011 |
| DE | 102011116298 A1 | 4/2012 |
| JP | 2011162187 A | 8/2011 |

* cited by examiner

*Primary Examiner* — Moshe Wilensky
(74) *Attorney, Agent, or Firm* — Raymond L. Coppiellie; Brooks Kushman P.C.

(57) ABSTRACT

The disclosure relates to a method for producing a transverse member having a securable ball joint receiving member from a transverse member having an integral ball joint receiving member. The transverse member is the kind used for connecting a vehicle wheel to a vehicle structure. The method comprises providing a transverse member having an integral ball joint receiving member, separating the integral ball joint receiving member from the transverse member, and connecting a securable ball joint receiving member to the transverse member to replace the removed integral ball joint receiving member. This method may be performed to correct the position and orientation of a ball joint as provided by the integral ball joint receiving member or to further utilize a production tool that already produces a transverse member with an integral ball joint receiving member.

15 Claims, 3 Drawing Sheets

METHOD FOR PRODUCING A TRANSVERSE MEMBER

CROSS-REFERENCE TO RELATED APPLICATIONS

This application claims foreign priority benefits under 35 U.S.C. §119(a)-(d) to DE 10 2013 200 406.0 filed Jan. 14, 2013, which is hereby incorporated by reference in its entirety.

TECHNICAL FIELD

The present disclosure relates to a method for producing a transverse member for connecting a vehicle wheel to a vehicle structure of a vehicle, in particular a motor vehicle.

BACKGROUND

A variety of embodiments of transverse members are generally known from the prior art. In particular, transverse members for connecting a vehicle wheel to a vehicle structure of a vehicle are known and have a connection location either having an integrated ball joint receiving member or having a ball joint receiving member which can be secured, for example, riveted or screwed.

In the case of the integrated ball joint receiving member, the ball joint receiving member is constructed integrally with the connection location of the transverse member in order to receive a ball joint. Such transverse members are particularly suitable for production with large batch numbers because they are distinguished by low production costs. However, a fixed articulation location for the ball joint to be received is fixed by the transverse members having an integrated ball joint receiving member. If, however, the position and/or orientation of the articulation location is intended to be changed, a new transverse member generally has to be designed, for which a new tool also has to be produced accordingly.

Alternatively, it is also possible to use the transverse member having a ball joint receiving member which can be secured to the connection location, for example, riveted or screwed, and in which the position of the articulation location of the ball joint receiving member can be changed simply by changing the ball joint receiving member itself, which is possible with a relatively small additional tool investment. In the case of large batch numbers, however, the transverse member having an integrated ball joint receiving member is superior to the transverse member having, for example, a riveted ball joint receiving member from the point of view of costs. Furthermore, the transverse member to which the securable ball joint receiving member is connected still has to be produced with a tool which is individual for that transverse member.

A transverse member having an integrated ball joint receiving member is described, for example, in DE 10 2010 007 946 A1. A transverse member having a ball joint receiving member which can be secured to a connection location of a transverse member is disclosed in DE 10 2011 116 298 A1.

Against this background, an object of the present disclosure is to provide a method for producing a transverse member for connecting a vehicle wheel to a vehicle structure of a vehicle, in particular a motor vehicle, by means of which it is primarily possible to reduce the production costs for the transverse member. This is intended to be achieved, on the one hand, in that fewer tools have to be used to produce the transverse member and, on the other hand, the necessary tools can be used in a more intensive manner.

It should be noted that the features set out individually in the following description can be combined with each other in any technically advantageous manner and set out additional embodiments of the disclosure. The description further characterizes and specifies the disclosure particularly with reference to the Figures.

SUMMARY

According to the disclosure, a method for producing a transverse member for connecting a vehicle wheel to a vehicle structure of a vehicle, in particular a motor vehicle, may have the following steps: 1) providing a transverse member having at least one connection location which has an end portion, on which a ball joint receiving member may be integrally constructed, 2) separating the end portion from the connection location, and 3) connecting a securable ball joint receiving member to the connection location.

On aspect of the disclosure is distinguished in that a transverse member having an integrated ball joint receiving member which can be integrally constructed therewith is used to produce a transverse member having a ball joint receiving member which can be connected thereto. It is thereby unnecessary to have an individual tool for producing the transverse member having the ball joint receiving member which can be secured thereto. Accordingly, only the tool for producing the transverse member having the integrated ball joint receiving member is also used for producing the transverse member having the ball joint receiving member which can be secured thereto, whereby the tool used can further be used in a substantially more intensive manner and the piece costs of both types of transverse members can be substantially reduced.

Another aspect of the disclosure is directed to the securable ball joint receiving member connected to the connection location in a non-releasable manner. This is intended to be understood in that the ball joint receiving member is connected to the connection location of the transverse member in such a manner that this connection cannot be disengaged again at least in a non-destructive manner. Such connection techniques may include, for example, riveting, welding, adhesive-bonding, clamping and the like. Such a connection ensures a reliable and durable retention of the securable ball joint receiving member at the connection location of the transverse member even with dynamic loads over the entire life cycle of the transverse member.

Another advantageous aspect of the disclosure makes provision for the securable ball joint receiving member to be connected to the connection location by means of rivets. In this case, the step of connecting the securable ball joint receiving member to the connection location further comprises the introduction of a plurality of connection openings in the connection location of the transverse member. The connection openings in the transverse member simultaneously also fix the correct position of the securable ball joint receiving member relative to the connection location of the transverse member in addition to the fundamental connection and securing function thereof.

In an alternative disclosed aspect, the securable ball joint receiving member is releasably connected to the connection location of the transverse member, for example, by means of screws. Connection openings are also introduced in the connection location of the transverse member in this instance, as previously described in the case of the connection by means of rivets.

According to yet another advantageous aspect of the disclosure, the securable ball joint receiving member has a sheet portion which is integrally constructed with the ball joint receiving member. The securable ball joint receiving member is connected to the connection location by means of the sheet portion. Consequently, the desired position and/or orientation of the ball joint receiving member relative to the transverse member or to the connection location of the transverse member can readily be corrected by means of the special construction of the sheet portion. Furthermore, the shape and configuration of the sheet portion can be selected in accordance with the selected connection technique in an optimum manner independent of the actual ball joint receiving member. Thus, for example, the sheet portion may also be angled in order to achieve a desired position of the articulation location of the ball joint which is received in the securable ball joint receiving member. As already set out above, the connection openings in the transverse member simultaneously also fix the correct position of the securable ball joint receiving member relative to the connection location of the transverse member in addition to the fundamental connection and securing function thereof.

Additional advantageous details and effects of the disclosure are explained in greater detail below with reference to the Figures.

DETAILED DESCRIPTION

Figure 1:
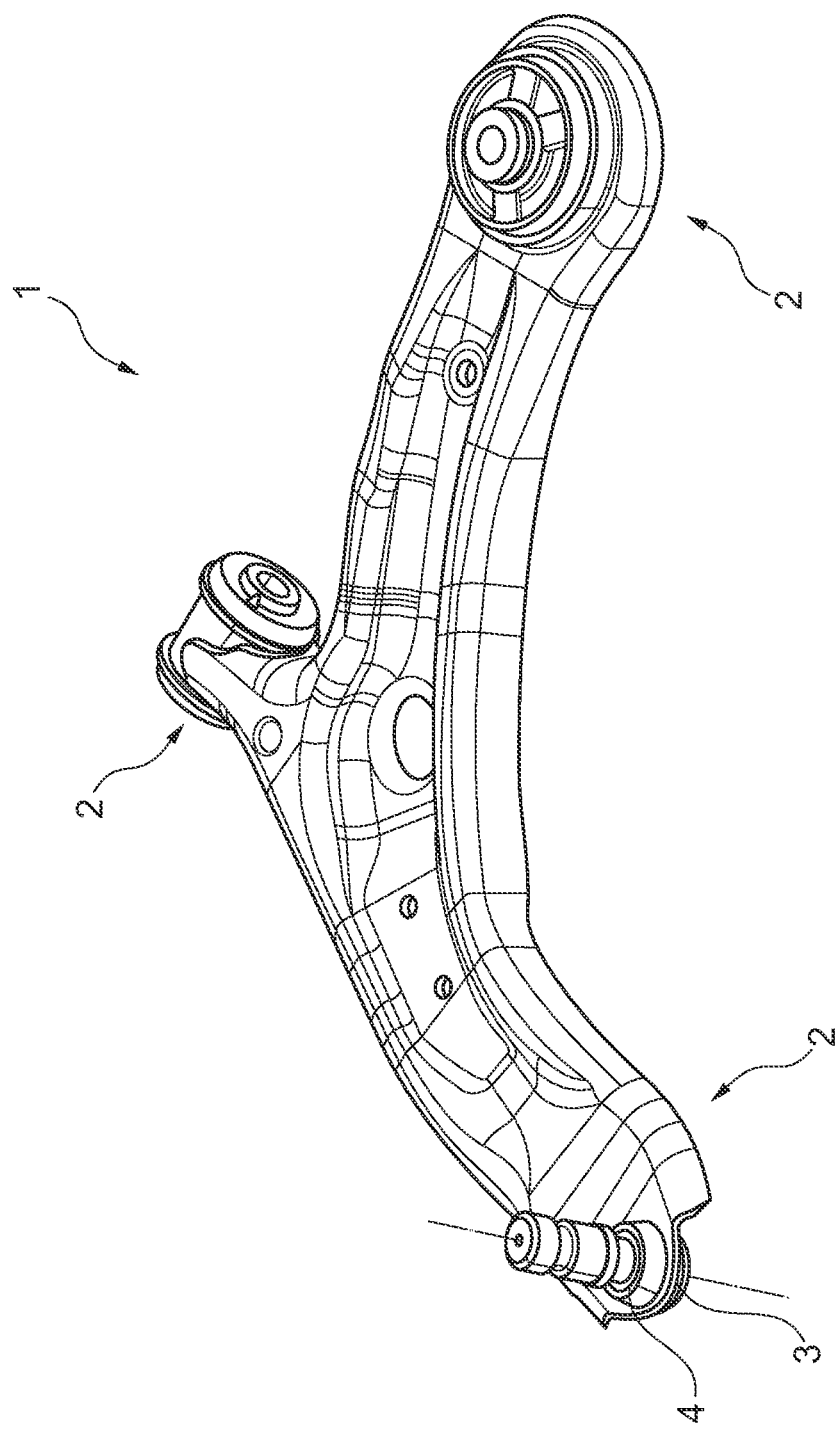
FIG. 1 is a perspective view of a transverse member having a ball joint receiving member which is integrally constructed at a connection location.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

In the various Figures, like or similar components may be indicated with like reference numerals so that they may also be generally only described once.

FIG. 1 is a perspective view of a transverse member 1 having a ball joint receiving member 3 which is integrally constructed at a connection location 2 (also referred to herein as an integrated ball joint receiving member 3). The transverse member 1 has two additional connection locations 2 which are arranged above and to the right of the connection location 2 constructed with the ball joint receiving member 3 in the plane of the drawing of FIG. 1. The upper and right-hand connection locations 2 of the transverse member 1 are used for connecting the transverse member 1 in an articulated manner to a vehicle structure (not illustrated in FIG. 1) of a vehicle (also not illustrated), in particular a motor vehicle. The connection location 2 constructed with the ball joint receiving member 3 is used for connecting a vehicle wheel in an articulated manner to the connection location 2 of the transverse member 1 and therefore to the vehicle structure of the vehicle. The ball joint receiving member 3 serves to receive a ball joint 4 which is known per se.

Figure 2:
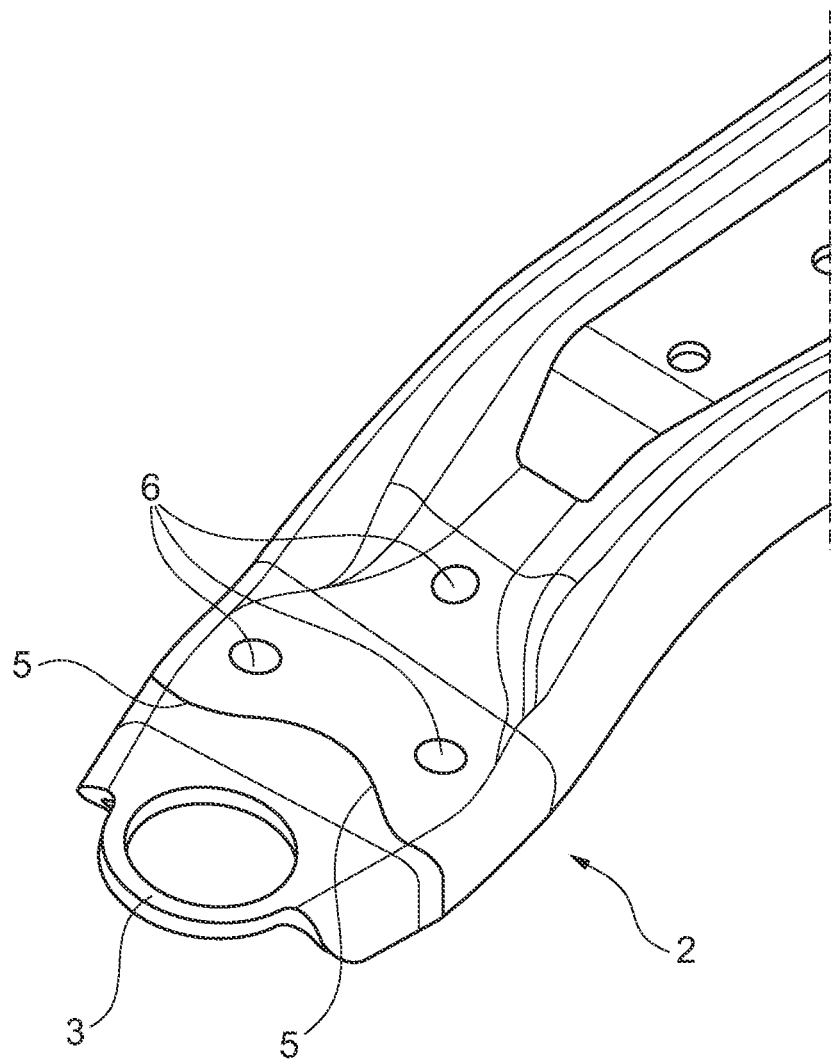
FIG. 2 is an enlarged perspective view of the connection location of the transverse member from FIG. 1.

FIG. 2 is an enlarged perspective view of the connection location 2 of the transverse member 1 which is shown in FIG. 1 and in which the end portion can be seen more clearly. As can further be seen, the integrated ball joint receiving member 3 substantially comprises an opening which is formed in the end portion of the connection location 2 and in which the ball joint 4 illustrated in FIG. 1 is received. Furthermore, FIG. 2 shows a cutting line 5 and three drill markings 6 at the connection location 2. Consequently, the end portion of the connection location 2 extends from the cutting line 5 as far as the free end of the connection location 2. The transverse member 1 illustrated in FIG. 1 is accordingly prepared and constructed at least at the connection location 2 thereof constructed with the integrated ball joint receiving member 3 in such a manner that the integrated ball joint receiving member 3 can be separated along the cutting line 5 from the connection location 2 and that holes can be formed in the connection location 2 at the locations indicated with the drill markings 6.

Figure 3:
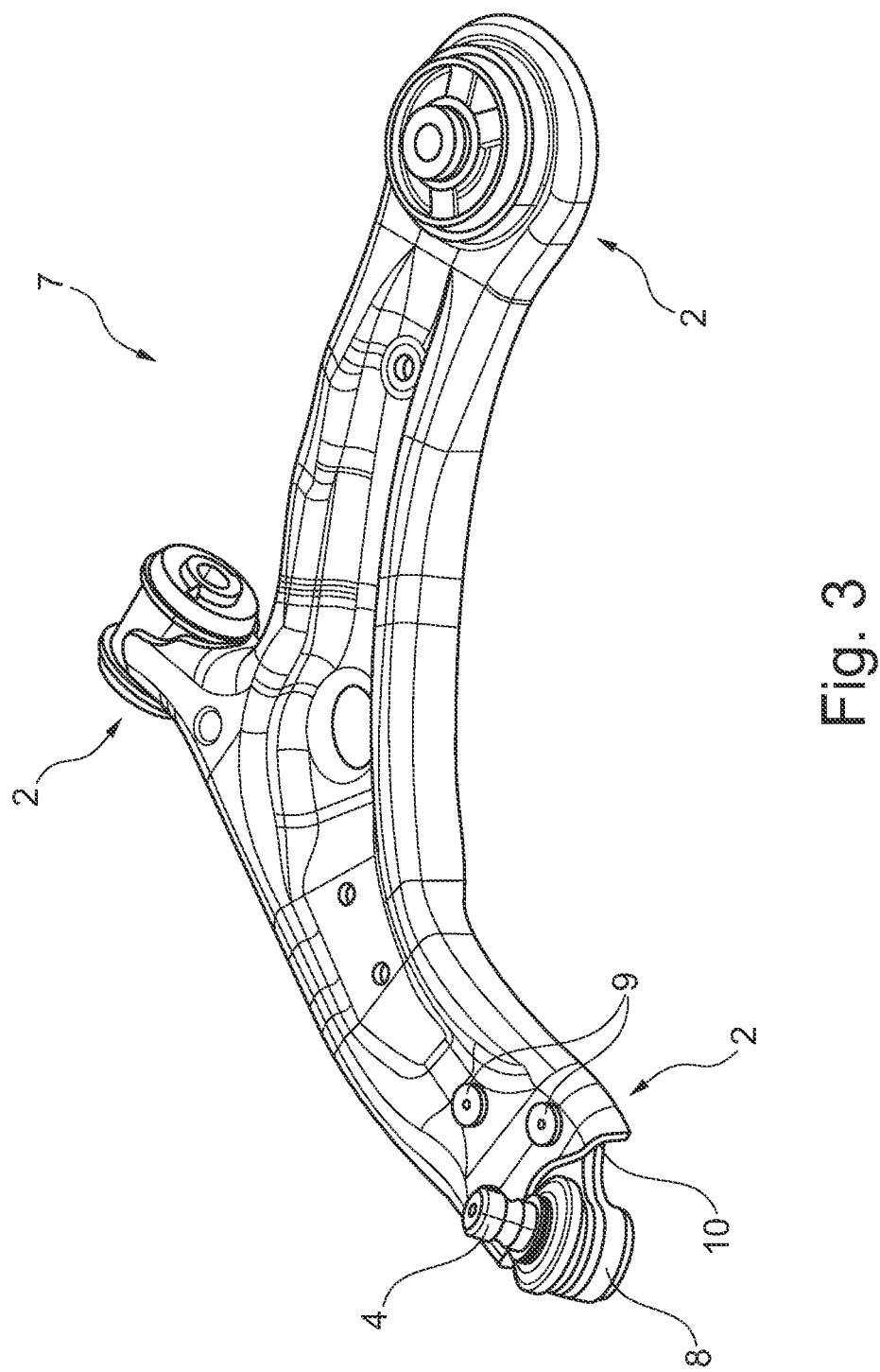
FIG. 3 is a perspective view of a transverse member which is produced by means of the method according to the disclosure from the transverse member of FIG. 1 and to the connection location of which illustrated in FIG. 2 a securable ball joint receiving member is connected.

FIG. 3 illustrates the result of a transverse member 7 which is produced from the transverse member 1 illustrated in FIG. 1 by means of the method according to the disclosure, after the following method steps have been applied: 1) providing the transverse member 1 illustrated in FIG. 1 with the connection location 2 which has an end portion on which the ball joint receiving member 3 is integrally constructed, 2) separating the end portion from the connection location 2 along the cutting line 5, 3) forming connection openings in the connection location 2 of the transverse member 1 at the drill markings 6, and 4) connecting a securable ball joint receiving member 8 to the connection location 2 by means of rivets 9.

The securable ball joint receiving member 8 in the embodiment shown is connected in a non-releasable manner to the connection location 2 of the transverse member 7 by the rivets 9. Furthermore, the securable ball joint receiving member 8 of the embodiment of the transverse member 7 illustrated in FIG. 3 has a sheet portion 10 which is integrally constructed with the securable ball joint receiving member 8 and by means of which the securable ball joint receiving member 8 is connected to the connection location 2. Only the beginning of the sheet portion 10 can be seen in FIG. 3 because it extends below the connection location 2 in the embodiment shown. FIG. 3 further shows that the sheet portion 10 can also be angled for correcting the position and orientation of the ball joint receiving member, and therefore the articulation location of the ball joint 4, in a manner suitable for the example illustrated. Alternatively, positioning could be carried out by means of the cutting line 5, with provision preferably being made for the connection openings in the transverse member 7 also simultaneously to fix the correct position of the securable ball joint receiving member 8 relative to the connection location 2 of the transverse member 7 in addition to their fundamental connection and securing function.

The method according to the disclosure allows a transverse member 1 having an integrated ball joint receiving member 3 which can be integrally constructed therewith to be used in order to produce a transverse member 7 having a securable ball joint receiving member 8 which can be connected thereto. It is thereby no longer necessary to have an individual tool for producing the transverse member 7 with the securable ball joint receiving member 8 which can be secured thereto. Accordingly, only the tool for producing the transverse member 1 with the integrated ball joint receiving member 3 is also used for producing the transverse member 7 with the securable ball joint receiving member 8 which can be secured thereto by the additional operations of separating the end portion from the connection location 2 along the cutting line 5 and forming connection openings in the connection location 2 of the transverse member 1 at the drill markings 6 being carried out. It is thereby possible to use the production tool used in a substantially even more intensive manner and the piece costs for producing both the transverse member 1 and the transverse member 7 can be substantially reduced.

The above-described method according to the disclosure for producing a transverse member for connecting a vehicle wheel to a vehicle structure of a vehicle, in particular a motor vehicle, is not limited to the embodiment disclosed herein but instead also comprises additional embodiments having the same effect. In particular, the method according to the disclosure is not limited to riveting of the securable ball joint receiving member with respect to the connection location. Identically acting, non-releasable connection techniques can also be used, such as, for example, bonding, welding, clamping and the like. It is also possible to have a releasable connection between the securable ball joint receiving member and the connection location of the transverse member, for example, by means of screws. Furthermore, it is not intended to be understood to be a limitation, as in the embodiment described herein, that a ball joint receiving member for the integrated ball joint in the form of an opening is already formed in the end portion of the connection location before the end portion is separated. Naturally, the end portion may be separated in accordance with the present disclosure without a ball joint receiving member being formed in the end portion of the connection location.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for producing a transverse member for connecting a vehicle wheel to a vehicle structure of a vehicle comprising:
    providing a transverse member having at least one connection location which has an end portion on which a ball joint receiving member, that orients a ball joint along a first axis, is integrally constructed;
    separating the end portion from the connection location; and
    connecting a securable ball joint receiving member, that orients the ball joint along a second axis that is non-parallel with the first axis, to the connection location.

2. The method of claim 1, wherein the securable ball joint receiving member is connected to the connection location in a non-releasable manner.

3. The method of claim 1 further comprising introduction of a plurality of connection openings in the connection location for the transverse member.

4. The method of claim 3, wherein the step of connecting a securable ball joint receiving member to the connection location comprises riveting the securable ball joint receiving member to the connection location via the connection openings.

5. The method of claim 1 further comprising providing the securable ball joint receiving member with a sheet portion which is integrally constructed with the securable ball joint receiving member and during the step of connecting a securable ball joint receiving member to the connection location, connecting the sheet portion to the connection location.

6. A method for correcting a position or orientation of a ball joint on a vehicle wheel transverse member, comprising:
    obtaining a transverse member having an integral ball joint receiving member that orients a ball joint at first position;
    separating the integral ball joint receiving member from the transverse member; and
    securing a securable ball joint receiving member, that orients the ball joint at a second position, to the transverse member.

7. The method of claim 6 further comprising determining a cutting line which allows for separation of the integral ball joint receiving member.

8. The method of claim 7 further comprising cutting the transverse member along the cutting line to remove the integral ball joint receiving member.

9. The method of claim 6 further comprising determining a drill marking on the transverse member for aiding in the securing of a securable ball joint receiving member.

10. The method of claim 9 wherein the step of determining a drill marking on the transverse member for aiding the securing of a securable ball joint receiving member includes determining three drill markings.

11. The method of claim 10 further comprising drilling the transverse member at the drill marking.

12. The method of claim 6 wherein the step of securing a securable ball joint receiving member to the transverse member includes riveting the securable ball joint receiving member to the transverse member.

13. The method of claim 6 further comprising providing a securable ball joint receiving member having a sheet portion angled for correcting the position or orientation of a ball joint.

14. The method of claim 13 wherein securing a securable ball joint receiving member to the transverse member includes securing the sheet portion to the transverse member.

15. The method of claim 13 further comprising angling the sheet portion of the securable ball joint receiving member such that the angle chosen provides for a different position or orientation of a ball joint from the position or orientation of a ball joint that the integral ball joint receiving member provides once the securable ball joint receiving member is secured to the transverse member.

* * * * *